United States Patent
Casaccia et al.

(10) Patent No.: US 6,788,930 B2
(45) Date of Patent: Sep. 7, 2004

(54) METHOD AND SYSTEM FOR DEPLETING BACKLOG IN A COMMUNICATION SYSTEM

(75) Inventors: Lorenzo Casaccia, San Diego, CA (US); Sai Yiu Duncan Ho, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 449 days.

(21) Appl. No.: 09/970,200

(22) Filed: Oct. 2, 2001

(65) Prior Publication Data

US 2003/0069005 A1 Apr. 10, 2003

(51) Int. Cl.$^7$ ................................................. H04B 1/06
(52) U.S. Cl. ................................. 455/414.1; 455/432.1
(58) Field of Search ............................ 455/414.1, 443, 455/435.1, 432.1

(56) References Cited

U.S. PATENT DOCUMENTS 4,901,307 A    2/1990  Gilhousen et al.
5,103,459 A    4/1992  Gilhousen et al.
6,650,869 B2 * 11/2003  Kelly et al. ................. 455/13.2

* cited by examiner

Primary Examiner—Creighton Smith
(74) Attorney, Agent, or Firm—Philip Wadsworth; Thien T. Nguyen; Kent D. Baker

(57) ABSTRACT

Method for reducing backlogged calls is disclosed. According to one embodiment, an initial parameter set providing an initial blocking probability and a timestamp is received. A current time index is determined based on the timestamp. Following, a current blocking probability is calculated based on the initial blocking probability and the current time index. The initial parameter set can also provide a delay period, a throughput rate, an expected new call rate and an initial backlog. The initial blocking probability can be determined, for example, from the throughput rate, expected new call rate and initial backlog. An elapsed time between the timestamp and the current system time is determined, and a current time index is determined by dividing the elapsed time by the delay period. A call request is blocked, for example, when a randomly generated number between 0 and 1 is less than the current blocking probability.

30 Claims, 3 Drawing Sheets

METHOD AND SYSTEM FOR DEPLETING BACKLOG IN A COMMUNICATION SYSTEM

BACKGROUND

1. Field

The present invention generally relates to the field of communications, and more specifically, to communications in a cellular communication system.

2. Background

A cellular communication system may operate in accordance with code division multiple access (CDMA) communication technique. Several CDMA systems have been in commercial operation for a number of years. In CDMA communication systems, a number of users in the same geographical area may choose to operate on a common carrier frequency. The signal from each user is encoded according to a unique assigned code. A receiver decodes each signal according to the assigned code. A receiver may receive signals from different users with a common carrier frequency. While a signal for one user is being decoded, the signals transmitted from all other users may be treated as interference. Excessive transmission by different users may cause interference for other users in addition to causing system overload at a base station. When a base station is overloaded it must reject a portion of the incoming call requests.

Rejecting a call request has several negative effects. One effect in particular is the amount of processing and bandwidth at the base station allocated to process a rejected call. Another effect is use of the mobile station power to initiate such a call request without success. Moreover, during a call request attempt, the mobile station may gradually increase its transmit power level which can affect communications of other mobile stations.

In certain situations, more mobile stations may attempt to access the base station than the number of available channels, i.e. the base station is overloaded. This may be the case when the mobile station traffic surges for unanticipated reasons or when the base station is damaged in some way and exhibits decreased capabilities for a period of time. Users whose call requests are rejected or not allowed by the base station will usually keep re-trying their call until accepted by the base station. The group of rejected or re-trying callers that accumulates during this period is referred to as the "backlogged" users, and the corresponding rejected call requests are referred to as the base station's "backlog". When the base station is repaired and put back online, for example, there will be backlogged users attempting to make calls in addition to the usual number of expected new calls. If the base station is not equipped to handle this combined load, many of the call requests may be rejected.

Thus, there is a need in the art for effective means for depleting backlog in a communication system.

SUMMARY

Embodiments disclosed herein address the above stated needs by gradually depleting backlog at a base station, utilizing a blocking probability generated from an initial parameter set.

In one aspect of the invention, an initial parameter set providing an initial blocking probability and a timestamp is received. Once the initial parameter set has been received, a current time index is determined based on the timestamp. Following, a current blocking probability is calculated based on the initial blocking probability and the current time index. After the current blocking probability has been calculated, a random number between 0 and 1 is generated and compared to the current blocking probability. A call request is blocked, for example, when the random number is less than the current blocking probability.

In another aspect of the invention, the initial parameter set also provides a delay period, a throughput rate, an expected new call rate and an initial backlog. The initial blocking probability is then determined from the throughput rate, the expected new call rate and the initial backlog. Subsequently, an elapsed time between the timestamp and the current system time is determined, and a current time index is determined by dividing the elapsed time by the delay period. Thereafter, a random number between 0 and 1 is generated, and call request is blocked, for example, when the random number is less than the current blocking probability.

DETAILED DESCRIPTION

The presently disclosed embodiments are directed to method and system for depleting backlog in a communication system. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings. The word "exemplary" is used exclusively herein to mean "serving as an example, instance, or illustration." Any embodiment described herein as "exemplary" is not necessarily to be construed as preferred or advantageous over other embodiments.

Figure 1:
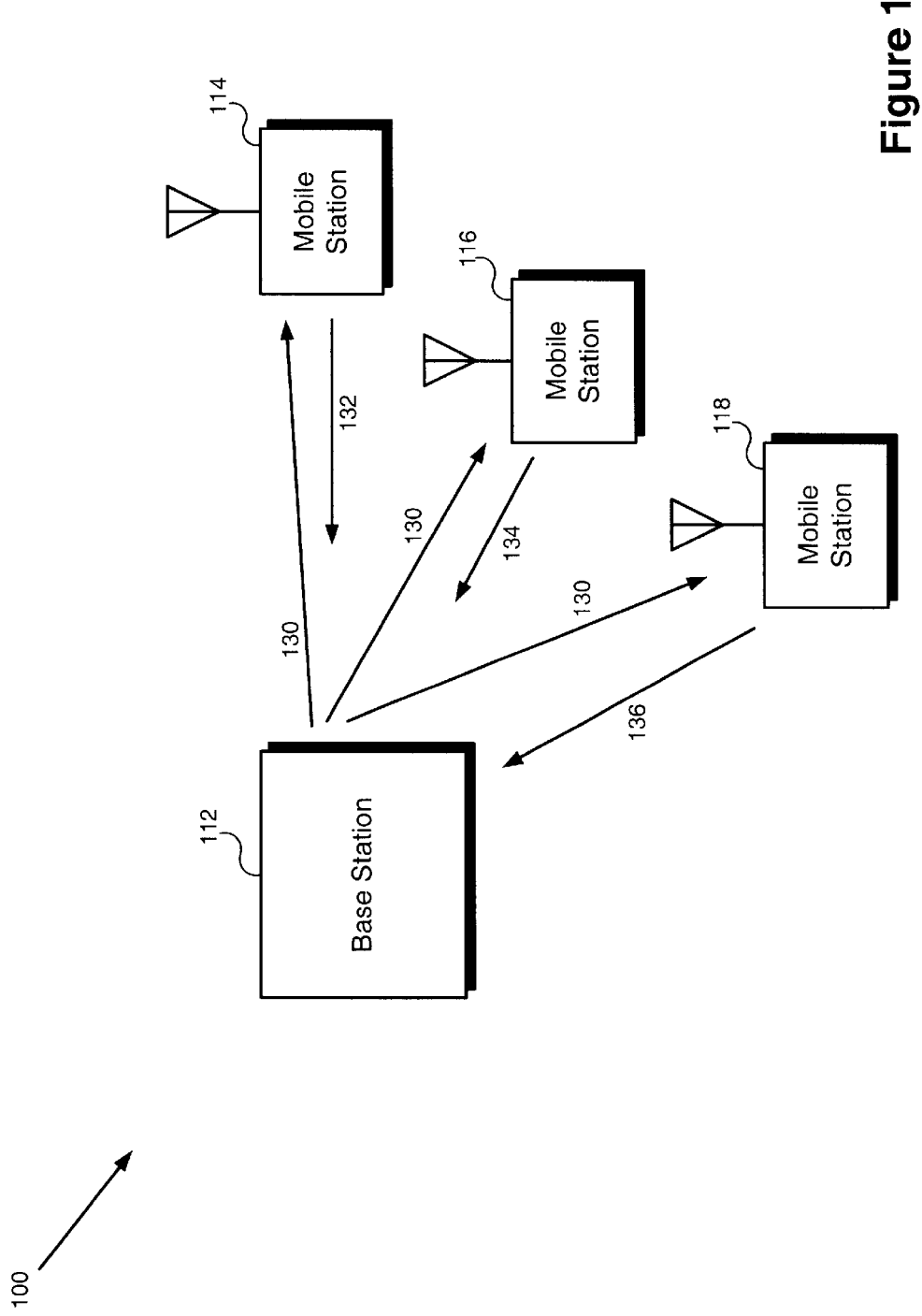
FIG. 1 illustrates an exemplary communication system capable of operating in accordance with various embodiments of the invention.

FIG. 1 illustrates a block diagram of an exemplary communication system 100 capable of operating in accordance with any of the code division multiple access (CDMA) communication standards. It is noted that the general principles of CDMA communication systems, and in particular the general principles for generation of spread spectrum signals for transmission over a communication channel is described in U.S. Pat. No. 4,901,307 entitled "Spread Spectrum Multiple Access Communication System Using Satellite or Terrestrial Repeaters" and assigned to the assignee of the present invention. The disclosure in that patent, i.e. U.S. Pat. No. 4,901,307, is hereby fully incorporated by reference into the present application. Moreover, U.S. Pat. No. 5,103, 459 entitled "System and Method for Generating Signal Waveforms in a CDMA Cellular Telephone System" and assigned to the assignee of the present invention, discloses principles related to PN spreading, Walsh covering, and techniques to generate CDMA spread spectrum communication signals. The disclosure in that patent, i.e. U.S. Pat. No. 5,103,459, is also hereby fully incorporated by reference into the present application. Further, the present invention utilizes time multiplexing of data and various principles related to "high data rate" communication systems, and the present invention can be used in a "high data rate" communication system, disclosed in U.S. patent application entitled "Method and Apparatus for High Rate Packet Data Transmission" Ser. No. 08/963,386 filed on Nov. 3, 1997, and assigned to the assignee of the present invention. The disclosure in that patent application is also hereby fully incorporated by reference into the present application.

Continuing with FIG. 1, communication system 100 comprises base station 112, which provides communication links between a number of mobile stations, such as mobile stations 114, 116, and 118. Base station 112 may include a number of components, such as a mobile station controller, a base station controller, and a radio frequency transceiver, for example. For simplicity, such components are not shown. Base station 112 may also be in communication with other base stations, which are also not shown. Base station 112 communicates with mobile stations 114, 116, and 118, via a forward link. The forward link may be maintained by a forward link signal transmitted from base station 112. The forward link signals targeted for several mobile stations 114, 116, and 118, may be summed to form forward link signal 130. In an exemplary embodiment, forward link 130 may represent a broadcast signaling message sent out over the control channel to all mobile stations in the cell, possibly as an Access Parameters Message or Enhanced Access Parameters Message, for example. Each of the mobile stations 114, 116, and 118, receiving forward link signal 130, decodes the forward link signal 130 to extract the information that is targeted for its user. At the receiving end, the receiver may treat as interference the portion of the received forward link signal 130 targeted for others.

Mobile stations 114, 116, and 118, communicate with base station 112 via a corresponding reverse link. Each reverse link is maintained by a reverse link signal, such as reverse link signals 132, 134, and 136, for respective mobile stations 114, 116, and 118. Base station 112 may also transmit a predefined series of data bits on a pilot channel via the forward link to all mobile stations to assist each mobile station in decoding the forward link signal 130, for example. The pilot channel transmitted from a mobile station may be used for decoding the information carried by the reverse link signal transmitted from the same mobile station. The use and operation of a pilot channel are well known. A transmitter and a receiver for communicating via the forward and reverse links are included in each of mobile stations 114, 116, and 118, and base station 112.

Once base station 112 is back to normal operation, it is desirable for base station 112 to control the number of incoming calls, i.e. calls originating from mobile stations 114, 116, and 118, so that base station 112 does not receive more calls than it can handle. In the present embodiment of the invention, base station 112 uses a blocking probability, p(n), to control the number of calls that are originated from mobile stations 114, 116, and 118, for example. The blocking probability at some time index n, denoted p(n), represents the percentage of calls that are to be blocked (i.e. not allowed to originate). Accordingly, higher values of p(n) result in a greater percentage of blocked call requests.

When there is backlog at base station 112 and the base station is willing to deplete it, the blocking probability p(n) is based on the offered load, i.e. expected new calls plus backlogs, and the throughput. The desired objective is to process the offered load of call requests at a steady throughput rate such that the backlog, denoted as "b", is decreased gradually over time until all the backlogged call requests have been depleted. It should be noted that the initial backlog, corresponding to n=0, is denoted as "b" or "b(0)", whereas the general expression of backlog as a function of n is denoted as "b(n)", where b(n) decreases as n increases. Additionally, since the initial backlog value b does not decrease until n=2, b(0) and b(1) are numerically equivalent.

Figure 2:
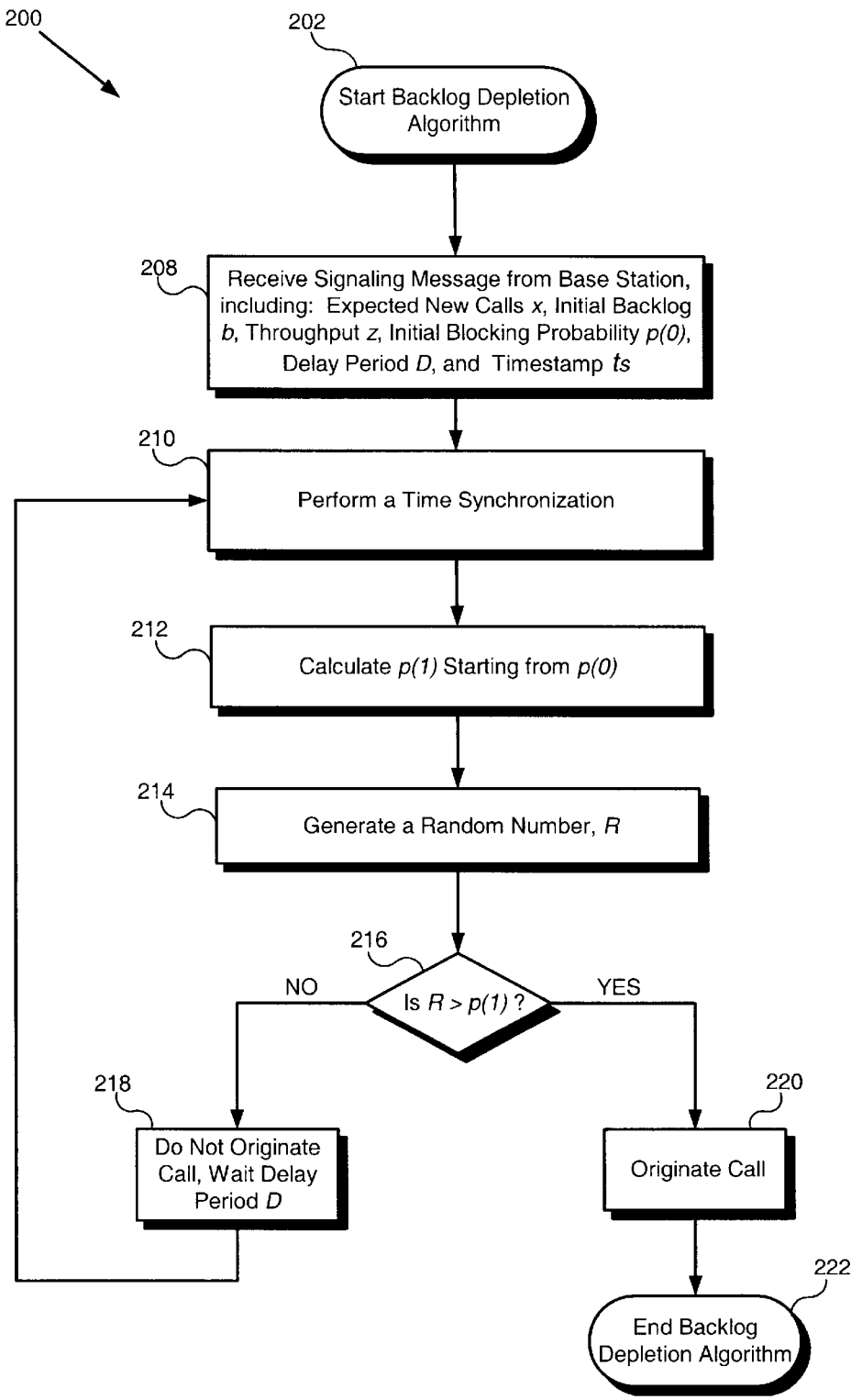
FIG. 2 illustrates an exemplary flow chart of the backlog depletion algorithm for the depletion of backlogged call requests in accordance with various embodiments of the invention.

Referring now to FIG. 2, backlog depletion algorithm 200 outlines an exemplary implementation of a backlog depletion algorithm in accordance with one embodiment of the present invention. For purposes of discussion, the following description contains references to the elements of FIG. 1. Backlog depletion algorithm 200, shown in FIG. 2, describes a process that may be triggered or initiated by base station 112 via forward link 130, and carried out within mobile stations 114, 116, and 118. Thus, backlog depletion algorithm 200 is performed by mobile stations 114, 116, and 118, but is turned on and off by base station 112.

At step 202, backlog depletion algorithm 200 begins. At step 208, the mobile stations, i.e. mobile stations 114, 116, and 118, receive parameters and values required to perform the backlog depletion algorithm from the base station, i.e. base station 112. Thus, prior to step 208, base station 112 decides the value of the following parameters: the delay period (D), the rate of expected new calls per D (i.e. "x"), and the throughput per D, i.e. "z". In addition, base station 112 also determines the magnitude of the initial backlog, i.e. "b". As mentioned previously, backlog is the existing number of re-trying users who will attempt to re-originate their calls each time D. It is assumed that users rejected previously will attempt to originate their calls each delay period D, until their calls are allowed to originate. Additionally, it is assumed that the number of users in the system is sufficiently large such that the new callers for each delay period D do not overlap with the backlog callers. The delay period D is the period of time that mobile stations 114, 116, and 118 must wait before re-trying a previously blocked call. The value of D is chosen by the base station such that it is much smaller than time T, i.e. D<<T, where T may be the period of time in which the backlogs b accumulated, for example. The throughput z is the number of calls base station 112 processes during any particular period D. The sum of the backlog b and expected new calls x, minus the throughput z, is called the offered load, X, for any period n such that X(n)=x+b(n)−z. Initially, at n=0, there is no throughput and X(0)=x+b(0), where b(0) is the initial backlog.

At step 208, mobile stations 114, 116, and 118 receive a signaling message from base station 112 via forward link signal 130. Forward link signal 130 broadcasted at step 208 to mobile stations 114, 116, and 118, includes information indicating the values for expected new calls x, initial backlog b, throughput z, initial blocking probability p(0), delay period D, and timestamp $t_s$. It is noted that the values for the expected new calls x, initial backlog b, and throughput z, are all used to calculate the initial blocking probability p(0). It is further noted that the information received by the mobile units from the base station at step 208 is also referred to as an "initial parameter set" in the present application. The signaling message broadcasted at step 208 may be an Access Parameters Message or an Enhanced Access Parameters Message, for example. Whenever mobile stations 114, 116, and 118 attempt to originate a call, they must first wait the delay period D and then perform steps 212, 214, and 216. At step 210, the mobile stations 112, 114, and 116 synchronize according to the timestamp, $t_s$, received at step 208. The timestamp ts may be the time that the algorithm starts, for example.

At step 212, mobile stations 114, 116, and 118 use the initial blocking probability, p(0), to calculate a subsequent blocking probability value, for instance the blocking probability at time n=1, or p(1). Once the value of p(1) has been calculated, a random number "R", uniformly distributed between 0 and 1, is generated at step 214.

Once R has been determined at step 214, backlog depletion algorithm 200 then proceeds to step 216 where R is compared to p(1) to determine whether R is greater than p(1). If R is not greater than p(1), then the algorithm proceeds to step 218 where the mobile station blocks any attempt to originate a call and must wait for the boundary of the next D-period before attempting to re-originate the call. In the latter case, i.e. when R is not greater than p(1), steps 212, 214, and 216 is repeated, and mobile stations 114, 116, and 118, can calculate the boundaries of the D-periods from the D value and timestamp $t_s$ received from the base station at step 208. For example, if the blocking probability is p=0.6, then it is desired that 60% of the mobile stations in the cell be blocked from originating their calls and 40% be allowed to originate their calls, for example. Since there is always a 60% chance of getting a random number R<0.6, it follows that 60% of callers will be blocked and must wait the delay period D before generating another random number to re-try their call. Thus, by giving each individual mobile station a 40% probability of successfully originating a call, the population of these individuals also exhibits the same probability, such that 40% of all mobile stations will be allowed to originate their calls.

If it is instead determined at step 216 that R is greater than p(1), the algorithm proceeds to step 220 where the call request is allowed to originate to the base station. Backlog depletion algorithm 200 then ends for the specific mobile at step 222.

Figure 3:
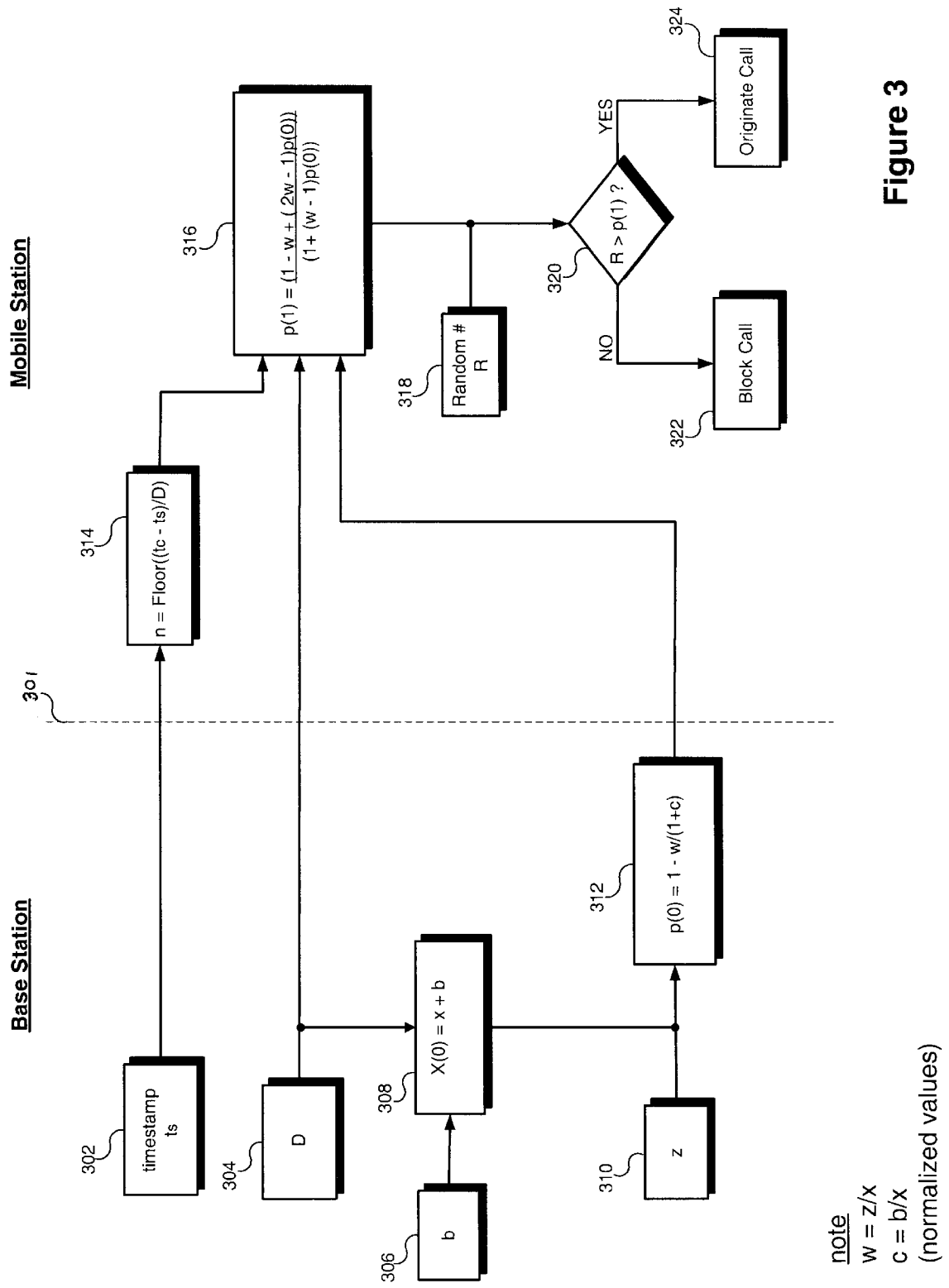
FIG. 3 illustrates an exemplary flow chart for the first iteration of the call request blocking probability.

FIG. 3 illustrates exemplary process 300 for generation of a blocking probability in accordance with one embodiment. FIG. 3 illustrates the method used to generate, for example, the blocking probability at time n equal to 1, corresponding to step 212 of FIG. 2. As shown in FIG. 3, operations on the left side of dashed vertical line 301 can be performed in base station 112, while operations on the right side of dashed vertical line 301 can be performed within each of mobile stations 114, 116, and 118.

In operation 302, a timestamp ts generated by an internal clock within base station 112 is received by mobile stations 114, 116, and 118, via forward link signal 130. In operation 304, a delay period D is defined by base station 112 as previously described and is transmitted to mobile stations 114, 116, and 118. In operation 306, the value of backlog b is determined by base station 112, as previously described. The initial offered load, X(0), is calculated in operation 308 as the sum of the expected new calls x and the initial backlog b. The rate of expected new calls, x, can be estimated by base station 112 in a manner known in the art. The delay period D generated in operation 304 is utilized in operation 308 to the extent that delay period D sets the units in which the expected rate of new calls x and backlog b are defined.

For example, if the base station defines D to equal 0.5 hr, then the values for x and b represent the number of calls per every 0.5 hr (i.e. number of calls per D). In operation 310, the desired throughput z is set by the base station. Throughput value z generated in operation 310 and the initial offered load X(0) generated in operation 308 are used to calculate the initial blocking probability, p(0), in operation 312.

The initial block probability p(0) calculated in operation 312 is received from base station 112 by mobile stations 114, 116, and 118, via forward link signal 130. The delay period D is also transmitted to mobile stations 114, 116, and 118, via forward link signal 130. In operation 314, the mobile stations use the timestamp $t_s$, and their current system time $t_c$, to perform a synchronization. For example, if a mobile station enters the cell of base station 112, the mobile station can synchronize itself to the correct point within the backlog depletion algorithm by using the timestamp $t_s$ provided by base station 112 via forward link 130. Continuing with operation 314, the values of n represents how many delay periods D have elapsed by dividing the difference between ts and tc by delay period D. It is noted that the time difference between ts and tc is also referred to as an "elapsed time" in the present application. The "Floor" operation returns the largest integer value that is not greater than the argument, e.g. Floor(3.3)=3, Floor (3.5)=3, and Floor(3.9)= 3. Thus, n is an index of time in the units of the delay period D, to which the mobile stations 114, 116, and 118, are set. If the current system time was $t_c$=4 hr., the timestamp received from base station 112 was $t_s$=1.2 hr., and delay period D=1.0 hr., for example, operation 314 would yield:

$$n=\text{Floor}((4.0-1.2)/1.0)=\text{Floor } (2.8)=2$$

Operation 316 uses the initial block probability p(0), the delay period D, and timestamp $t_s$, to determine the next blocking probability, p(1). In operation 318, a random number R, between 0 and 1, is generated by the mobile station and compared to the value of p(1) in operation 320 to determine if random number R is greater than p(1). If the outcome of operation 320 is "NO", i.e. if R is not greater than p(1), then operation 322 is performed. However, if the outcome of operation 320 is "YES", then operation 324 is performed. Operation 322 results in a blocked call request, meaning that an attempted call is not allowed to originate from the mobile station. Conversely, operation 324 results in a call request that is allowed to originate from the mobile station to base station 112 via a reverse link. It is noted that since each of mobile stations 114, 116, and 118 is generating its own R, and comparing its R to the blocking probability, operation 320 can produce different results for each mobile station. Thus, operation 320 gives each mobile station a probability equal to p(1) that its call attempt will not be allowed to originate, i.e. that a call attempt will be blocked.

In an exemplary iteration of backlog depletion scheme 300, the following numerical values will be used. As stated above, the timestamp $t_s$, backlog b, and delay period D, are decided by base station 112 in operations 302, 304, and 306, respectively. The delay period value of D=1 hr. (where T=3 hrs. and D<<T) will be used for the present example. Furthermore, x=100 calls/hour, X(0)=x+b, and z=110 calls/ hour. In other words, base station 112 expects to receive 100 new calls plus backlog b, per time D, and can throughput 110 calls per time D. Using an exemplary initial backlog value of b=b(0)=200 calls and initial offered load X(0)=300, subsequent iterations of operation 308 will yield:

| | |
|---|---|
| X(0) = x + b(0) = 100 + 200 = 300 calls/hour | b(0) = 200 |
| X(1) = x + b(1) − z = 300 − 110 = 190 calls/hour | b(1) = 200 |
| X(2) = x + b(2) − z = 100 + 190 − 110 = 180 calls/hour | b(2) = 190 |
| X(3) = x + b(3) − z = 100 + 180 − 110 = 170 calls/hour | b(3) = 180 |
| X(4) = x + b(4) − z = 100 + 170 − 110 = 160 calls/hour | b(4) = 170 |
| . | . |
| . | . |
| . | . |
| X(n) = 1 + X(n − 1) − z | b(n) = X(n − 1) |
| X(n) → 100 calls/hour | b(n) → 0 calls |

In the manner shown above, the initial offered load X(0) is decreased with each iteration by the gradual depletion of the remaining backlog b(n) from the previous period. As shown above, for example, the initial backlog of b(0)=200 calls is depleted to b(4)=170 calls after the fourth iteration, i.e. at n=4. In other words, with each iteration, base station 112 throughputs more calls than the expected number of new calls and can therefore accept some backlog calls as well. Therefore, the remaining backlog existing after a given iteration is the offered load from the previous iteration, i.e. b(n)=X(n−1). The final line of the above iteration shows that the backlog depletion algorithm is complete when the initial backlog b is depleted, i.e. when b(n)→0, and the offered load is reduced to the expected rate of new calls, i.e. X(n)→100 calls/hour.

After an elapsed period, also referred to as K, all backlogs b will be depleted. In this example, 10 backlog callers are depleted per hour, meaning that it would take K=20 hours to deplete all of the original b(0)=200 calls. Using the above stated values, the corresponding values for p(n) calculated in operation 316 are:

$p(0) = 0.633$ $p(1) = 0.621$ $p(2) = 0.607$ $p(3) = 0.593$ $p(4) = 0.577$ $\vdots$ $p(n) = 1 - w/X(n) = \dfrac{(1 - w + (2w - 1)p(n-1))}{(1 + (w-1)p(n-1))}$ (iterative formula)

$p(n) \to 0$ or alternatively, $p(n) = 1 - w/(n(1 - w) + 1 + c)$ (non-iterative formula)

where
  w=z/x (that is, z normalized to x)
  c=b/x (that is, b normalized to x)

As shown above, successive iterations of the blocking probability p(n) decrease toward zero, i.e. p(n)→0, such that every time a caller (i.e. mobile stations 114, 116, and 118) retries a call there is a greater probability of success in originating the call and not getting blocked. Mobile stations 114, 116, and 118 carry out subsequent iterations of p(n) starting with an initial blocking probability p(0) and accompanying information (i.e. throughput z and backlog b) provided by base station 112, for example. The iterative formula for p(n) is more complex and requires the value of the previous blocking probability, p(n−1), and is thus based on the value for p(0). The non-iterative formula, however, does not require the value p(0), but instead requires the values of the initial backlog b in addition to the throughput z.

Thus, in the manner described above, the invention provides method and system for depleting backlog in a communication system. Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. The software module, also called a computer program in the present application, may contain a number of source code or object code segments and may reside in any computer readable medium such as a RAM memory, flash memory, ROM memory, EPROM memory, EEPROM memory, registers, hard disk, a removable disk, a CD-ROM, a DVD-ROM or any other form of computer readable medium known in the art. An exemplary computer readable medium is coupled to the processor, where the processor can read information from, and write information to, the computer readable medium. In the alternative, the computer readable medium may be integral to the processor. The processor and the computer readable medium may reside in an ASIC. The ASIC may reside in a mobile unit, base station transceiver, or satellite transponder. In the alternative, the processor and the computer readable medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

We claim:

1. A method for depleting backlog in a communication system, said method comprising steps of:
   receiving an initial parameter set, said initial parameter set comprising an initial blocking probability and a timestamp;
   determining a current time index based on said timestamp;
   calculating a current blocking probability based on said initial blocking probability and said current time index.

2. The method of claim 1 further comprising a step of:
   blocking a call request based on said current blocking probability.

3. The method of claim 1 further comprising steps of:
   generating a random number between 0 and 1;
   comparing said current blocking probability with said random number;
   blocking a call request when said random number is less than said current blocking probability.

4. The method of claim 1 wherein said initial parameter set further comprises a delay period, a throughput rate, an expected new call rate and an initial backlog.

5. The method of claim 4 wherein said initial blocking probability is based on said throughput rate, said expected new call rate and said initial backlog.

6. The method of claim 5 further comprising steps of:
   determining an elapsed time between said timestamp and a current system time;
   determining said current time index by dividing said elapsed time by said delay period.

7. The method of claim 6 wherein said current blocking probability is calculated based on said current time index, said throughput rate, said expected new call rate and said initial backlog.

8. The method of claim 7 further comprising steps of:
   generating a random number between 0 and 1;
   comparing said current blocking probability with said random number;
   blocking a call request when said random number is less than said current blocking probability.

9. The method of claim 1 wherein said current blocking probability is inversely proportional to said current time index.

10. An apparatus for depleting backlog in a communication system, said apparatus comprising:
    means for receiving an initial parameter set, said initial parameter set comprising an initial blocking probability and a timestamp;
    means for determining a current time index based on said timestamp;
    means for calculating a current blocking probability based on said initial blocking probability and said current time index.

11. The apparatus of claim 10 further comprising:
    means for blocking a call request based on said current blocking probability.

12. The apparatus of claim 10 further comprising:
    means for generating a random number between 0 and 1;
    means for comparing said current blocking probability with said random number;
    means for blocking a call request when said random number is less than said current blocking probability.

13. The apparatus of claim 10 wherein said initial parameter set further comprises a delay period, a throughput rate, an expected new call rate and an initial backlog.

14. The apparatus of claim 13 wherein said initial blocking probability is based on said throughput rate, said expected new call rate and said initial backlog.

15. The apparatus of claim 14 further comprising:
    means for determining an elapsed time between said time stamp and a current system time;
    means for determining said current time index by dividing said elapsed time by said delay period.

16. The apparatus of claim 15 wherein said current blocking probability is calculated based on said current time index, said throughput rate, said expected new call rate and said initial backlog.

17. The apparatus of claim 16 further comprising:
    means for generating a random number between 0 and 1;
    means for comparing said current blocking probability with said random number;
    means for blocking a call request when said random number is less than said current blocking probability.

18. The apparatus of claim 10 wherein said current blocking probability is inversely proportional to said current time index.

19. A method for depleting backlog in a communication system, said method comprising steps of:
    receiving a timestamp, a delay period, a throughput rate, an expected new call rate and an initial backlog,
    determining an elapsed time from said timestamp to a current system time;
    determining a current time index by dividing said elapsed time by said delay period;
    calculating a current blocking probability based on said throughput rate, said expected new call rate, said initial backlog and said current time index.

20. The method of claim 19 further comprising a step of:
    blocking a call request after said calculating step.

21. The method of claim 19 further comprising steps of:
    generating a random number between 0 and 1;
    comparing said current blocking probability with said random number;
    blocking a call request when said random number is less than said current blocking probability.

22. The method of claim 19 wherein said current blocking probability is inversely proportional to said current time index.

23. A method for depleting backlog in a communication system, said method comprising steps of:
    receiving a timestamp, a delay period, a throughput rate, an expected new call rate and an initial backlog,
    determining an elapsed time between said timestamp and a current system time;
    determining a current time index by dividing said elapsed time by said delay period;
    calculating a current blocking probability based on said throughput rate, said expected new call rate, said initial backlog and said current time index;
    generating a random number between 0 and 1;
    comparing said current blocking probability with said random number;
    blocking a call request when said random number is greater than said current blocking probability.

24. The method of claim 23 further comprising steps of:
receiving an initial blocking probability;
determining said current blocking probability based on said initial blocking probability and said current time index.

25. The method of claim 23 wherein said current blocking probability is inversely proportional to said current time index.

26. A computer readable medium including a computer program, said computer program depleting backlog in a communication system, said computer program comprising:
a first code segment for receiving an initial parameter set, said initial parameter set comprising an initial blocking probability and a timestamp;
a second code segment for determining a current time index based on said timestamp;
a third code segment for calculating a current blocking probability based on said initial blocking probability and said current time index.

27. The computer readable medium of claim 26 wherein said computer program further comprises:
a fourth code segment for blocking a call request based on said current blocking probability.

28. The computer readable medium of claim 27 wherein said computer program further comprises:
a fifth code segment for generating a random number between 0 and 1;
a sixth code segment for comparing said current blocking probability with said random number;
a seventh code segment for blocking a call request when said random number is less than said current blocking probability.

29. The computer readable medium of claim 26 wherein said initial parameter set further comprises a delay period, a throughput rate, an expected new call rate and an initial backlog.

30. The computer readable medium of claim 29 wherein said initial blocking probability is based on said throughput rate, said expected new call rate and said initial backlog.

* * * * *